Figure 1:
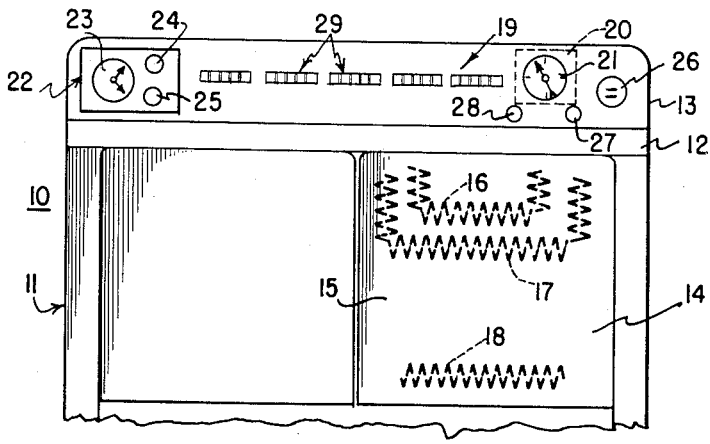

Oct. 6, 1953  G. W. SCHROEDER  2,654,824
CONTROL FOR ELECTRIC OVENS
Filed March 8, 1951  2 Sheets-Sheet 1

INVENTOR.
George W. Schroeder
BY
Smith, Olsen & Baird
Attys.

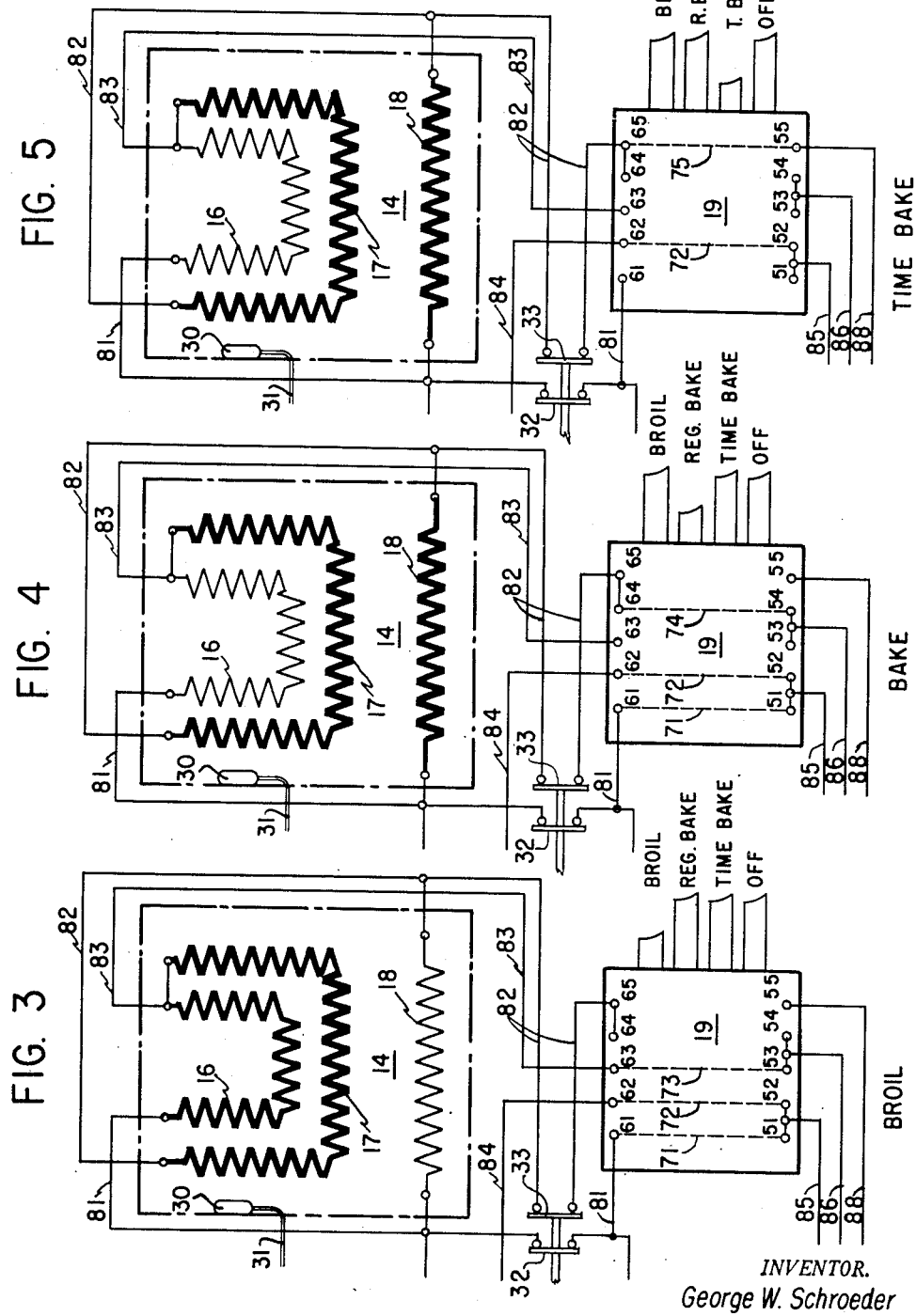

Patented Oct. 6, 1953

2,654,824

UNITED STATES PATENT OFFICE 2,654,824

CONTROL FOR ELECTRIC OVENS

George W. Schroeder, Sandy Hook, Conn., assignor to General Electric Company, a corporation of New York Application March 8, 1951, Serial No. 214,559

9 Claims. (Cl. 219—20)

The present invention relates to controls for electric ovens, and more particularly to improved controls for electric broiling and baking ovens of the general character disclosed in U. S. Patent No. 2,515,427, granted on July 18, 1950 to Herman W. Schulze.

In the Schulze patent, there is disclosed an electric range comprising a broiling and baking oven provided with first and second heating elements disposed adjacent to the top of the oven cavity and a third heating element disposed adjacent to the bottom of the oven cavity, as well as a unitary control switch of the rotary type having off, broil, regular bake and time bake positions. Also the range comprises a three-wire Edison source of current supply, a manually settable thermostatic switch responsive to the temperature in the oven cavity, and a manually settable timer switch.

In this range, the control switch is operative into its broil position to connect the first and second heating elements in parallel across the outside lines of the Edison source and to open the circuit to the third heating element; and the control switch is operative into its regular bake and time bake positions to connect the second and third heating elements in parallel across the outside lines of the Edison source and to open the circuit to the first heating element. Also in the time bake position of the control switch, the timer switch is included in series with the connection mentioned between one of the outside lines of the Edison source and the associated terminals of the second and third heating elements; and in the regular bake position of the control switch, the timer switch is excluded from the last-mentioned connection. Finally the thermostatic switch is included in series with both of the outside lines of the Edison source.

While the control circuit arrangement for the oven of this range is entirely satisfactory in operation and very economical to manufacture, it is not altogether safe from the standpoint of electrical shock hazard to the cook when the control switch occupies its time bake position and the timer switch occupies its open position and when heating elements of the open resistance coil type are employed. More particularly open resistance coil heating elements, as distinguished from sheathed resistance conductor heating elements, are frequently employed in the oven cavity, these heating elements being suitably supported by and insulated from removable frames or racks respectively supported adjacent to the top of the oven cavity and adjacent to the bottom of the oven cavity in the general manner disclosed in U. S. Patent No. 2,498,583, granted on February 21, 1950 to Herman W. Schulze. More specifically, under the particular circumstances noted, the heating elements are not thermally hot since the timer switch occupies its open position, but one of the outside lines of the Edison source is connected to a terminal of each of the heating elements, whereby the outside line-neutral line voltage of the Edison source is impressed between each of the heating elements and the grounded metal oven liner and the grounded metal body of the range. While the cook is not apt to touch the lower heating element, since it is ordinarily covered by an associated heat deflecting baffle, she might touch either one of the upper heating elements, since the associated heat deflecting baffle is ordinarily disposed thereabove. More specifically the cook might touch one of the upper heating elements incident to placing a roasting pan, or the like, in the oven cavity while she is also in contact with the oven cavity liner or the body of the range, resulting in an electrical shock, or even an electrical burn should her contacts with the parts noted be sufficiently good.

In this range, the other positions of the control switch do not present the electrical shock hazard noted as the various heating elements become thermally hot such a short time interval after the control switch is operated into its broil position or into its regular bake position and since the cook is not apt to touch a thermally hot heating element.

Accordingly it is the general object of the present invention to provide a control for an electric oven that reduces to a minimum shock hazard to the cook in carrying out the various broiling and baking operations in the oven when open resistance coil type heating elements are employed therein.

Another object of the invention is to provide in an electric oven provided with a baking heater of the oven resistance coil type, an improved circuit network that includes a manual control switch that may be selectively set into time bake and regular bake positions so as respectively to include and to exclude an associated manually settable timer switch, wherein the touching of one of the baking heaters while the control switch occupies its time bake position and the timer switch occupies its open position presents no electrical shock hazard to the cook.

Another object of the invention is to provide in an electric baking oven provided with heating elements, a circuit network that includes a manual control switch for selectively connecting the heating elements in different circuit arrangements to obtain the different heating conditions in the oven cavity, wherein the circuit network also embodies an improved arrangement of a manually settable timer switch and a thermostatic switch that is responsive to the temperature of the oven capacity, as well as an arrangement of a control switch pilot lamp responsive to operation of the control switch out of its off position and a thermostatic switch pilot lamp responsive to operation of the thermostatic switch into its closed position.

A further object of the invention is to provide in an electric broiling and baking oven including a number of heating elements, an improved circuit network that is selectively operative to energize all of the heating elements in a first circuit arrangement to produce a disproportional distribution of heat in the upper portion of the oven cavity for broiling purposes and to energize all of the heating elements in a second circuit arrangement to produce a substantially uniform distribution of heat throughout the oven cavity for baking purposes.

A still further object of the invention is to provide in an electric broiling and baking oven including two heating elements disposed adjacent to the top of the oven cavity and a single heating element disposed adjacent to the bottom of the oven cavity, an improved circuit network that is selectively operative to energize each of the heating elements named in a first circuit arrangement to produce a broiling condition in the oven cavity and to energize each of the heating elements named in a second circuit arrangement to produce a baking condition in the oven cavity.

Further features of the invention pertain to the particular arrangement of the elements of the circuit control network, whereby the above-outlined and additional operating features thereof are attained.

Figure 2:
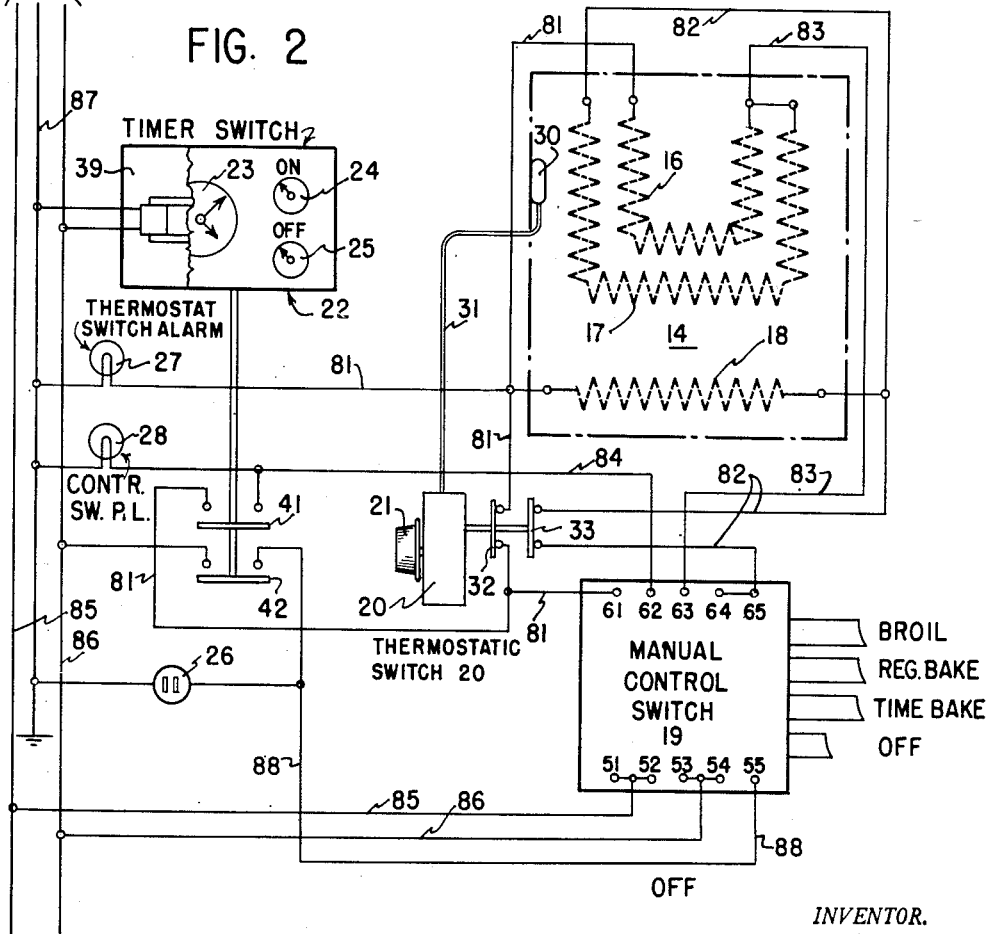

The invention, both as to its organization and method of operation, together with further objects and advantages thereof, will best be understood by reference to the following specification taken in connection with the accompanying drawings, in which Figure 1 is a fragmentary front view of the upper portion of an electric range incorporating a broiling and baking oven control embodying the present invention; Fig. 2 is a diagram of the circuit control network incorporated in the range shown in Fig. 1, all of the switches and circuit controls being illustrated in their normal or off positions; Fig. 3 is a fragmentary portion of the diagram shown in Fig. 2, illustrating the circuit connections when the manual control switch occupies its broil position; Fig. 4 is another fragmentary portion of the diagram shown in Fig. 2, illustrating the circuit connections when the manual control switch occupies its regular bake position; and Fig. 5 is a further fragmentary portion of the diagram shown in Fig. 2, illustrating the circuit connections when the manual control switch occupies its time bake position. In the diagrams of the heating elements 16, 17 and 18 appearing in Figs. 2, 3, 4 and 5, a broken line indicates that the heating element is deenergized; a heavy line indicates that the heating element is energized at substantially 100% of its full rated wattage; and a light line indicates that the heating element is energized at substantially 5% of its full rated wattage.

Referring now to Fig. 1 of the drawings, the electric range 10 there illustrated and incorporating the broiling and baking oven control embodying the features of the present invention comprises an upstanding metal body 11 that is provided with a cooking top 12 terminating in an upwardly directed backsplash 13. A broiling and baking oven cavity 14 is defined in the upper right-hand portion of the body 11 by a metal oven liner, not shown, which oven cavity 14 is provided with a door 15 that is hinged adjacent to the lower edge thereof and movable between open and closed positions. In the upper portion of the oven cavity 14, a first removable frame, not shown, is provided that supports first and second electric heating elements 16 and 17 in a substantially horizontal and coplanar position and in inner and outer relation with respect to each other; and in the lower portion of the oven cavity 14, a second removable frame, not shown, is provided that supports a third electric heating element 18 in a substantially horizontal position. Preferably the heating elements 16, 17 and 18 are of the open resistance coil type and are arranged upon the respective upper and lower frames in the general manner disclosed in the previously-mentioned Schulze Patent No. 2,498,583, it being understood that the electric heating elements are suitably electrically insulated from the associated supporting frames.

The circuit network that is provided for the purpose of selectively controlling the electric heating elements 16, 17 and 18 comprises a manual control switch 19 mounted upon the backsplash 13 that is preferably of the pushbutton type and of the general construction disclosed in U. S. Patent No. 2,431,904, granted on December 2, 1947 to John L. Andrews. Specifically the control switch 19 is of the pushbutton type and includes four individual manually operable pushbuttons respectively corresponding to the off, broil, regular bake and time bake positions thereof. In passing, it is noted that the control switch 19 is so constructed and arranged that as any one of its pushbuttons is manually actuated into its in position, the last-actuated one of its pushbuttons is returned to its out position, and the control switch is set into its control position corresponding to the presently actuated one of its pushbuttons. Also the backsplash 13 carries a thermostatic switch 20 that is provided with a manually operable control dial 21, as well as a timer switch 22 that is provided with a clock face 23, a manually settable on knob 24 and a manually settable off knob 25. Further the backsplash 13 carries a receptacle 26, a thermostatic switch pilot lamp 27, a control switch pilot lamp 28, and a number of other pushbutton switches 29 for controlling the surface units, not shown, that are also carried by the cooking top 12.

Referring now more particularly to Fig. 2 of the drawings, it is pointed out that the thermostatic switch 20 further comprises a thermal responsive element 30 arranged within the oven cavity 14 and responsive to the temperature therein, as well as a connecting capillary tube 31, and a pair of contact bridging members 32 and 33. It will be understood that the thermostatic switch 20 may be selectively set to maintain any predetermined temperature within the oven cavity 14 by proper manipulation of the control dial 21. Specifically in the thermostatic switch 20, the bridging members 32 and 33 normally bridge or close the associated pairs of contacts and are operated to open the associated pairs of contacts in response to an influence upon the thermal responsive element 30 indicating that the temperature within the oven cavity 14 has reached the temperature previously set by the control dial 21.

Preferably the timer switch 22 is of the general construction of that disclosed in U. S. Patent No. 1,522,988, granted on January 13, 1925 to Henry E. Warren, and comprises a synchronous electric motor 39 of the "Telechron" type, as well as a pair of contact bridging members 41 and 42. The bridging members 41 and 42 normally occupy open positions with respect to the associated pairs of contacts, and are later operated into closed positions with respect to the associated pairs of contacts, at a first preset time governed by the "on" control knob 24, and are still later operated back into their open positions with respect to the associated pairs of contacts, at a second preset time governed by the off control knob 25. For example, in the timer switch 22, the on control knob 24 may be set to a first predetermined time, such, for example, as 5 o'clock, and the off control knob 25 may be set to a second predetermined time, such, for example, at 6 o'clock; whereby the timer switch 22 effects the selective controls noted of the bridging members 41 and 42 at the two previously set times so that a baking operation is carried out in a manner more fully explained hereinafter in the oven cavity 14 from 5 o'clock to 6 o'clock.

The manual control switch 19 of the pushbutton type further comprises five incoming terminals 51, 52, 53, 54 and 55, five outgoing terminals 61, 62, 63, 64 and 65, and five individual switch blades 71, 72, 73, 74 and 75, as best shown in Figs. 3, 4 and 5. The individual switch blades 71, etc. are adapted to complete connections between the corresponding individual incoming terminals 51, etc., and the corresponding individual outgoing terminals 61, etc., in the different positions of the control switch 19, as explained more fully hereinafter. Also in the control switch 19, the incoming terminals 51 and 52 are permanently strapped, the incoming terminals 53 and 54 are permanently strapped, and the outgoing terminals 64 and 65 are permanently strapped.

Further the circuit network comprises first, second and third busses 81, 82 and 83. The first bus 81 is commonly connected to one terminal of the first heating element 16 and to one terminal of the third heating element 18 and to the first outgoing terminal 61 of the control switch 19; the second bus 82 is commonly connected to one terminal of the second heating element 17 and to the other terminal of the third heating element 18 and to the fifth outgoing terminal 65 of the control switch 19; while the third bus 83 is commonly connected to the other terminal of the first heating element 16 and the other terminal of the second heating element 17 and to the third outgoing terminal 63 of the control switch 19. Also the pairs of contacts respectively controlled by the bridging members 32 and 33 of the thermostatic switch 20 are respectively included in the first and second busses 81 and 82. Finally, the second outgoing terminal 62 of the control switch 19 is connected to a first conductor 84 that is employed for a purpose more fully explained hereinafter. Further the circuit network comprises a three-wire Edison source of current supply of 236 volt A. C. that includes two outside lines 85 and 86 and a grounded neutral line 87. The first outside line 85 is commonly connected to the first and second incoming terminals 51 and 52 of the control switch 19; while the second outside line 86 is commonly connected to the third and fourth incoming terminals 53 and 54 of the control switch 19. Finally, the fifth incoming terminal 55 of the control switch 19 is connected to a second conductor 88 that is employed for a purpose more fully explained hereinafter.

In the circuit network, the receptacle 26 is provided with a circuit between the outside line 86 and the neutral line 87 that includes the pair of contacts controlled by the bridging member 42 of the timer switch 22 and the second conductor 88; and the operating motor 39 of the timer switch 22 is connected directly across the outside line 86 and the neutral line 87, whereby the clock 23 is continuously operated for ordinary time indicating purposes. The thermostatic switch pilot lamp 27 is connected directly between the first bus 81 and the neutral line 87; while the control switch pilot lamp 28 is connected directly between the first conductor 84 and the neutral line 87. Finally, the pair of contacts controlled by the bridging member 41 are respectively connected to the first bus 81 and to the first conductor 84; while the pair of contacts controlled by the bridging member 42 are respectively connected to the second conductor 88 and to the outside line 86.

Considering now the operation of the circuit control network in conjunction with the control of the heating elements 16, 17 and 18, it is noted that when the off pushbutton of the control switch 19 is actuated, the five incoming terminals 51 to 55, inclusive, are respectively disconnected from the five outgoing terminals 61 to 65, inclusive, as indicated in Fig. 2, whereby the heating elements 16, 17 and 18 are deenergized, as shown in broken lines in Fig. 2. Also at this time it may be assumed that the oven cavity 14 is cold so that the thermostatic switch 20 operates the bridging members 32 and 33 to close the associated pairs of contacts. Further it may be assumed that the timer switch 20 is operating for clock purposes but that neither of the control knobs 24 nor 25 is set. At this time the thermostatic switch pilot lamp 27 and the control switch pilot lamp 28 are extinguished.

Now assuming that the cook wishes to perform a broiling operation, she merely operates the broil pushbutton of the control switch 19 setting the circuit elements into the condition shown in Fig. 3, whereby the first, second and third incoming terminals 51, 52 and 53 are respectively connected to the first, second and third outgoing terminals 61, 62 and 63 by the respective first, second and third switch blades 71, 72 and 73. When the control switch 19 is thus operated into its broil position, the first heating element 16 is directly energized via the first and third busses 81 and 83 across the outside lines 85 and 86 of the Edison source. On the other hand, the second heating element 17 and the third heating element 18 are energized in series circuit relation across the outside lines 85 and 86 of the Edison source; this circuit including the first bus 81, the third heating element 18, the second bus 82, the second heating element 17 and the third bus 83. Accordingly the first heating element 16 develops its full rated wattage of approximately 3200 watts; the second heating element 17 develops substantially its full rated wattage of approximately 500 watts; and the third heating element 18 develops approximately 134 watts, which is only a very small fraction of its full rated wattage. Thus in the broil position of the control switch 19, the total wattage developed in the oven cavity 14 is approximately 3834 watts; however substantially 3700 watts of this total wattage is developed by the first and second heating elements 16 and 17 so that a disproportional amount of heat is produced in the upper portion of the oven cavity 14, which is desirable for broiling purposes.

Normally when a broiling operation is to be carried out in the oven cavity 14, the control dial 21 of the thermostatic switch 20 is set up to its maximum temperature position and the door 15 is cracked to ventilate the oven cavity 14, whereby the thermostatic switch 20 ordinarily exercises no control during the broiling operation. Also at this time the thermostatic switch pilot lamp 27 is illuminated between the first bus 81 and the neutral line 87 in order to indicate that the bridging member 32 of the thermostatic switch 20 occupies its closed position with respect to the associated pair of contacts; and the control switch pilot lamp 28 is illuminated between the first conductor 84 and the neutral line 87 in order to indicate that the control switch 19 occupies other than its off position.

Now assuming that the cook wishes to perform a regular baking operation, she first sets the control dial 21 to the temperature that is desired in the oven cavity 14, and merely operates the regular bake pushbutton of the control switch 19 setting the circuit elements into the condition shown in Fig. 4, whereby the first, second and fourth incoming terminals 51, 52 and 54 are respectively connected to the first, second and fourth outgoing terminals 61, 62 and 64 by the respective first, second and fourth switch blades 71, 72 and 74. When the control switch 19 is thus operated into its regular bake position, the third heating element 18 is directly energized via the first and second busses 81 and 82 across the outside lines 85 and 86 of the Edison source. On the other hand, the first heating element 16 and the second heating element 17 are energized in series circuit relation across the outside lines 85 and 86 of the Edison source; this circuit including the first bus 81, the first heating element 16, the second heating element 17 and the second bus 82. Accordingly the third heating element 18 develops its full rated wattage of approximately 3000 watts; while the second heating elements 17 develop substantially its full rated wattage of approximately 500 watts; and the first heating element 16 develops approximately 140 watts, which is only a very small fraction of its full rated wattage. Thus in the regular bake position of control switch 19, the total wattage developed in the oven cavity 14 is approximately 3640 watts; however substantially 3000 watts of this total wattage is developed by the third heating element 18 so that a disproportionate amount of heat is produced in the lower portion of the oven cavity 14, which is necessary in order that a substantially uniform distribution of the heat be effected throughout the oven cavity 14, which is desirable for regular baking purposes.

During the carrying out of the regular baking operation in the oven cavity 14, when the temperature therein reaches the temperature previously set by the control dial 21 of the thermostatic switch 20, the heat responsive element 30 is suitably influenced in order to govern the thermostatic switch 20 so that the bridging members 32 and 33 are operated respectively to open the first and second busses 81 and 82 so as to deenergize each of the heating elements 16, 17 and 18. The temperature within the oven cavity 14 then subsides, and when it reaches a temperature slightly below that previously set by the control dial 21 of the thermostatic switch 20, the heat responsive element 30 is suitably influenced in order to govern the thermostatic switch 20 so that the bridging members 32 and 33 are again operated respectively to close the first and second busses 81 and 82 so as again to energize each of the heating elements 16, 17 and 18. As the regular baking operation is continued, the thermostatic switch 20 operates in the manner described above to hold the previously set temperature in the oven cavity 14. During the regular baking operation, the thermostatic switch pilot lamp 27 is illuminated only when the bridging members 32 and 33 of the thermostatic switch 20 occupy their closed positions with respect to the associated pairs of contacts, producing a corresponding indication; and the control switch pilot lamp 28 is illuminated in order to indicate that the control switch 19 occupies other than its off position.

Finally assuming that the cook wishes to perform a time baking operation, she first sets the control dial 21 to the temperature that is desired in the oven cavity 14, and then sets the time during which the time baking operation is desired upon the timer switch 22. Specifically the on control knob 24 is set at the time it is wished to initiate the baking operation, such, for example, as 5 o'clock; and the off control knob 25 is set at the time at which it is wished to arrest the baking operation, such, for example, as 6 o'clock. The cook then operates the time bake pushbutton of the control switch 19 setting the circuit elements into the condition shown in Fig. 5, whereby the second and fifth incoming terminals 52 and 55 are respectively connected to the second and fifth outgoing terminals 62 and 65 by the respective second and fifth switch blades 72 and 75. When the control switch 19 is thus operated into its time bake position, a circuit is prepared for energizing the third heating element 18 via the first and second busses 81 and 82 and via the first and second conductors 84 and 88 directly across the outside lines 85 and 86; which circuit is open at this time at the two pairs of contacts respectively controlled by the bridging members 41 and 42 of the timer switch 22. Also, a circuit is prepared for energizing in series the first heating element 16 and the second heating element 17 via the first and second busses 81 and 82 and the first and second conductors 84 and 88 across the outside lines 85 and 86; which circuit is also open at this time at the two pairs of contacts respectively controlled by the bridging members 41 and 42 of the timer switch 22. Accordingly the operation of the control switch 19 into its time bake position only prepares the circuits mentioned for energizing the heating elements 16, 17 and 18 and connects no potential to the terminals thereof.

Thus at this time while the timer switch 22 occupies its open position, there is no potential upon the heating elements 16, 17 and 18; and accordingly there is no shock hazard to the cook should she inadvertently touch any one of the heating elements 16, 17 or 18 while she is also in contact with the metal liner of the oven cavity 14 or the metal body of the range 10.

Continuing now with the time baking operation, when the clock 23 of the timer switch 22 reaches the 5 o'clock position set by the on control knob 24, the bridging members 41 and 42 are operated into their closed positions with respect to the associated pairs of contacts. When the bridging member 42 is operated into its closed position, a connection is completed from the outside line 86 via the second conductor 88, the fifth incoming terminal 55, the fifth switch blade 75, and the fifth outgoing terminal 65 to the second bus 82; and when the bridging member 41 is operated into its closed position, a connection is completed from the outside line 85 via the incoming terminal 52, the second switch blade 72, the second outgoing terminal 62, and the first conductor 84 to the first bus 81. At this time, the third winding 18 is energized directly across the first and second busses 81 and 82, while the first heating element 16 and the second heating element 17 are energized in series circuit relation across the first and second busses 81 and 82. Accordingly at this time, the third heating element 18 develops the 3000 watts, and the first and second heating elements 16 and 17 together develop the 640 watts, in the manner previously explained in conjunction with the regular baking operation.

The time baking operation proceeds in a manner identical to that of the regular baking operation previously described under the control of the thermostatic switch 20 and until the clock 23 reaches the 6 o'clock position set by the off control knob 25; whereupon the bridging members 41 and 42 are operated back into their open positions with respect to the associated pairs of contacts, thereby interrupting the previously-traced circuits for energizing the heating elements 16, 17 and 18. Again it will be observed that when the bridging members 41 and 42 of the timer switch 22 are returned to their open positions with respect to the associated pairs of contacts, all potentials are removed from the heating elements 16, 17 and 18 in order again to eliminate any shock hazard to the cook should she inadvertently touch any one of the heating elements noted while she is also in contact with the metal liner of the oven cavity 14. At this time, the time baking operation has been completed. In the time baking operation, the control of the thermostatic switch pilot lamp 27 and the control of the control switch pilot lamp 28 are the same as described in conjunction with the regular baking operation.

In passing, it is noted that the timer switch 22 at the bridging member 42 also selectively closes and opens the circuit to the receptacle 26 at the two times respectively set by the on control knob 24 and by the off control knob 25, whereby the receptacle 26 may be employed to supply energy at 118 volts A. C. to a coffee pot or other electric appliances. This facility for controlling the supply of energy to the receptacle 26 by the timer switch 22 may be employed either along or in conjunction with the time baking operation of the control switch 19 depending upon the control position of the control switch 19. In other words, when the control switch 19 occupies other than its time bake position the timer switch 22 may be employed solely for the purpose of controlling the receptacle 26; and when the control switch 19 occupies its time bake position, the timer switch 22 may be employed jointly for the purpose of controlling the receptacle 26 and the heating elements 16, 17, and 18.

Returning now to the control of the heating elements 16, 17 and 18, in order to obtain broiling and baking operations in the oven cavity 14, it will be appreciated that the arrangement wherein each of the heating elements 16, 17 and 18 is energized to obtain both of the controls noted is very advantageous in view of the fact that there is no heating element that is not used in one or the other of the controls noted. Essentially this feature is achieved by switching the second heating element 17 into series with the third heating element 18 in the broil position of the control switch 19 and by switching the second heating element 17 into series with the first heating element 16 in the bake position of the control switch 19. In order to obtain the wattage ratings of the heating elements 16, 17 and 18, previously described in conjunction with the three-wire Edison source of current supply of 236 volts A. C. the resistance of each of the heating elements 16, 17 and 18 must be of a predetermined value and bear a predetermined relation with respect to the resistance of each of the other heating elements. In the present example, the first heating element 16 has a resistance of approximately 17.4 ohms; the second heating element 17 has a resistance of approximately 70 ohms; and the third heating element 18 has a resistance of approximately 18.6 ohms. Accordingly the first heating element 16 is productive of the 3200 watts when it is connected across the outside lines 85 and 86 of the Edison source; the third heating element 18 is productive of the 3000 watts when it is connected across the outside lines 85 and 86; the second heating element 17 and the third heating element 18 are productive of the 634 watts when they are connected in series circuit relation across the outside lines 85 and 86; and the second heating element 17 and the first heating element 16 are productive of the 640 watts when they are connected in series circuit relation across the outside lines 85 and 86.

In the broil position of the control switch 19, the first and second heating elements 16 and 17 are productive of the approximately 3700 watts in the upper portion of the oven cavity 14 and the third heating element 18 is productive of the approximately 134 watts in the lower portion of the oven cavity 14, which distribution of heat is substantially ideal for broiling purposes since there is a greater amount of heat in the upper portion of the oven cavity 14 and a smaller amount of heat in the lower portion of the oven cavity 14, the greater amount of heat in the upper portion of the oven cavity 14 being employed directly for broiling purposes and the smaller amount of heat in the lower oven cavity 14 being employed to prevent the lower portion of the oven cavity 14 from extracting any substantial amount of heat from the upper portion thereof.

In the bake positions of the control switch 19, the third heating element 18 is productive of approximately 3000 watts in the lower portion of the oven cavity 14 and the first and second heating elements 16 and 17 are productive of approximately 640 watts in the upper portion of the oven cavity 14, which production of heat is substantially ideal for the purpose of obtaining a substantially uniform distribution of heat in the oven cavity 14 for baking purposes since the heat in the oven cavity 14 has a normal tendency to rise therein by virtue of the connection currents in the oven cavity 14.

In passing, it is noted that the utilization of the control switch 19 of the pushbutton type is very advantageous due to the convenience of operation thereof, but that a rotary control switch of the general character of that disclosed in the Schulze Patent No. 2,515,427 might be employed if desired, since the fundamental features of operation of the circuit network are not predicated upon the constructional details of the control switch 19.

In view of the foregoing, it is apparent that there has been provided an improved control for an electric broiling and baking oven that is efficient in operation, simple in action, and safe in use.

While there has been described what is at present considered to be the preferred embodiment of the invention, it will be understood that various modifications may be made therein, and it is intended to cover in the appended claims all such modifications as fall within the true spirit and scope of the invention.

What is claimed is:

1. An electric broiling and baking oven comprising first and second electric heating elements disposed adjacent to the top of said oven, a third electric heating element disposed adjacent to the bottom of said oven, a pair of electric current supply conductors, and a unitary control switch having broil and bake positions, said control switch being operative into its broil position to connect said first heating element directly across said supply conductors and to connect said second and third heating elements in series relation across said supply conductors, said control switch being operative into its bake position to connect said first and second heating elements in series relation across said supply conductors and to connect said third heating element directly across said supply conductors, said first heating element having a somewhat higher wattage rating than said third heating element, said third heating element having a considerably higher wattage rating than said second heating element, said first and second heating elements being arranged substantially coplanar and in inner and outer relation with respect to each other.

2. An electric broiling and baking oven comprising first and second electric heating elements disposed adjacent to the top of said oven, a third electric heating element disposed adjacent to the bottom of said oven, a first bus connected commonly to one terminal of said first heating element and to one terminal of said third heating element, a second bus connected commonly to one terminal of said second heating element and to the other terminal of said third heating element, a third bus connected commonly to the other terminal of said first heating element and to the other terminal of said second heating element, first and second electric current supply conductors, a unitary control switch having broil and bake positions, said control switch being operative into its broil position to connect said first supply conductor to said first bus and to connect said second supply conductor to said third bus, said control switch being operative into its bake position to connect said first supply conductor to said first bus and to connect said second supply conductor to said second bus, and a timer switch associated with said oven and operative selectively to open and to close said connection between said first supply conductor and said first bus.

3. An electric broiling and baking oven comprising first and second electric heating elements disposed adjacent to the top of said oven, a third electric heating element disposed adjacent to the bottom of said oven, a first bus connected commonly to one terminal of said first heating element and to one terminal of said third heating element, a second bus connected commonly to one terminal of said second heating element and to the other terminal of said third heating element, a third bus connected commonly to the other terminal of said first heating element and to the other terminal of said second heating element, first and second electric current supply conductors, a unitary control switch having broil and bake positions, said control switch being operative into its broil position to connect said first supply conductor to said first bus and to connect said second supply conductor to said third bus, said control switch being operative into its bake position to connect said first supply conductor to said first bus and to connect said second supply conductor to said second bus, and a timer switch associated with said oven and operative selectively to open and to close both said connection between said first supply conductor and said first bus and said connection between said second supply conductor and said second bus.

4. An electric baking oven comprising first and second electric baking units respectively disposed adjacent to the top of said oven and adjacent to the bottom of said oven, a first bus connected commonly to one terminal of said first baking unit and to one terminal of said second baking unit, a second bus connected commonly to the other terminal of said first baking unit and to the other terminal of said second baking unit, first and second conductors, first and second electric current supply lines, a unitary control switch having regular bake and time bake positions, said control switch being operative into its regular bake position to connect said first supply line to said first bus and to connect said second supply line to said second bus, said control switch being operative into its time bake position to connect said first supply line to said first conductor and to connect said second conductor to said second bus, and a timer switch having first and second positions, said timer switch being operative into its first position to connect said second supply line to said second conductor and to connect said first conductor to said first bus, said timer switch being operative into its second position to disconnect said second supply line from said second conductor and to disconnect said first conductor from said first bus.

5. An electric baking oven comprising first and second electric baking units respectively disposed adjacent to the top of said oven and adjacent to the bottom of said oven, a first bus connected commonly to one terminal of said first baking unit and to one terminal of said second baking unit, a second bus connected commonly to the other terminal of said first baking unit and to the other terminal of said second baking unit, first and second conductors, first and second electric current supply lines, a unitary control switch having regular bake and time bake positions, said control switch being operative into its regular bake position to connect said first supply line to said first bus and to connect said second supply line to said second bus, said control switch being operative into its time bake position to connect said first supply line to said first conductor and to connect said second conductor to said second bus, a timer switch having first and second positions, said timer switch being operative into its first position to connect said second supply line to said second conductor and to connect said first conductor to said first bus, said timer switch being operative into its second position to disconnect said second supply line from said second conductor and to disconnect said first conductor from said first bus, and a thermostatic switch associated with said oven and responsive to the temperature therein, said thermostatic switch being selectively operative to open and to close at least one of said busses.

6. The electric baking oven set forth in claim 4, wherein said timer switch is operative from its second position into its first position and then from its first position back into its second position at two manually settable and preselected different times.

7. An electric baking oven comprising first and second electric baking units respectively disposed adjacent to the top of said oven and adjacent to the bottom of said oven, a first bus connected commonly to one terminal of said first baking unit and to one terminal of said second baking unit, a second bus connected commonly to the other terminal of said first baking unit and to the other terminal of said second baking unit, first and second conductors, a three-wire Edison electric current suply source provided with first and second outside lines and a neutral line, a control switch pilot lamp having two terminals respectively connected to said first conductor and to said neutral line, a unitary control switch having regular bake and time bake positions, said control switch being operative into its regular bake position to connect said first outside line commonly to said first bus and to said first conductor and to connect said second outside line to said second bus, said control switch being operative into its time bake position to connect said first supply line to said first conductor and to connect said second conductor to said second bus, and a timer switch having first and second positions, said timer switch being operative into its first position to connect said second supply line to said second conductor and to connect said first conductor to said first bus, said timer switch being operative into its second position to disconnect said second supply line from said second conductor and to disconnect said first conductor from said first bus.

8. An electric baking oven comprising first and second electric baking units respectively disposed adjacent to the top of said oven and adjacent to the bottom of said oven, a first bus connected commonly to one terminal of said first baking unit and to one terminal of said second baking unit, a second bus connected commonly to the other terminal of said first baking unit and to the other terminal of said second baking unit, first and second conductors, a three-wire Edison electric current supply source provided with first and second outside lines and a neutral line, a unitary control switch having regular bake and time bake positions, said control switch being operative into its regular bake position to connect said first supply line to said first bus and to connect said second supply line to said second bus, said control switch being operative into its time bake position to connect said first supply line to said first conductor and to connect said second conductor to said second bus, a timer switch having first and second positions, said timer switch being operative into its first position to connect said second supply line to said second conductor and to connect said first conductor to said first bus, said timer switch being operative into its second position to disconnect said second supply line from said second conductor and to disconnect said first conductor from said first bus, a thermostatic switch arranged in both said first and second busses and responsive to the temperature of said oven, said thermostatic switch being selectively operative to open and to close said first and second busses, and a thermostatic switch pilot lamp having two terminals respectively connected to one of said busses between said thermostatic switch and the associated terminals of said first and second baking units and to said neutral line.

9. The electric broiling and baking oven set forth in claim 2, and further comprising a thermostatic switch associated with said oven and responsive to the temperature therein, said thermostatic switch being selectively operative to open and to close said connection between said first supply conductor and said first bus.

GEORGE W. SCHROEDER.

References Cited in the file of this patent
UNITED STATES PATENTS

| Number | Name | Date |
|---|---|---|
| 1,495,045 | Rankin | May 20, 1924 |
| 1,943,310 | Heise | Jan. 16, 1934 |
| 2,203,236 | Randolph et al. | June 4, 1940 |
| 2,218,778 | Weimer | Oct. 22, 1940 |
| 2,385,434 | Weber | Sept. 25, 1945 |
| 2,421,452 | Cody | June 3, 1947 |
| 2,515,427 | Schulze | July 18, 1950 |
| 2,541,314 | Weber et al. | Feb. 13, 1951 |
| 2,556,450 | Schulze | June 12, 1951 |